W. J. FABER.
RESILIENT WHEEL.
APPLICATION FILED JUNE 13, 1912.
1,055,895.
Patented Mar. 11, 1913.
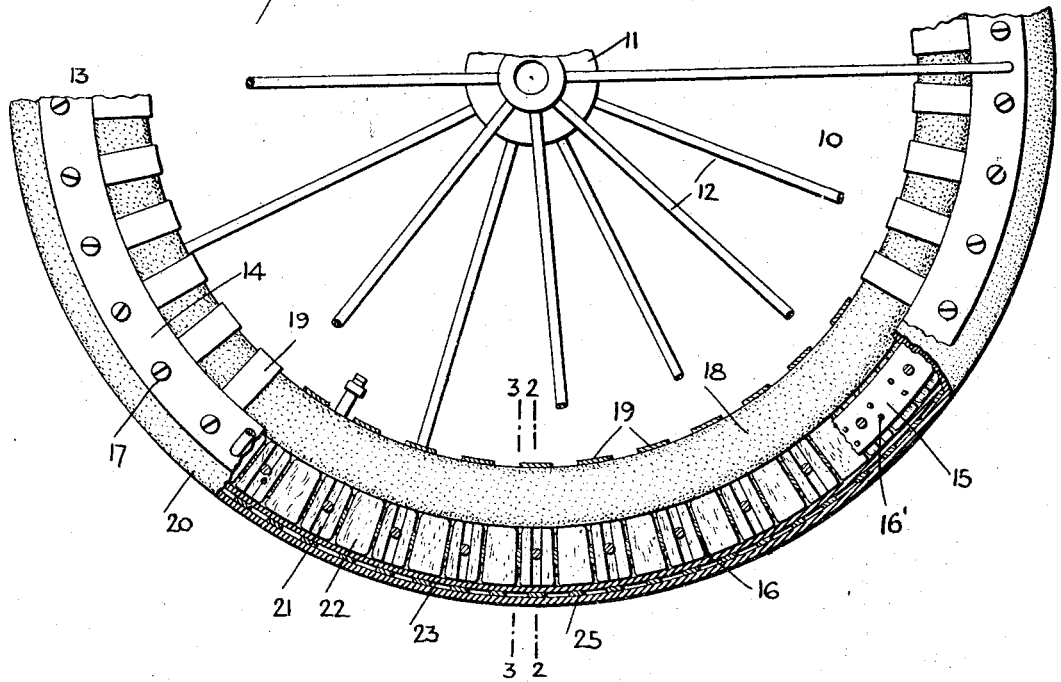
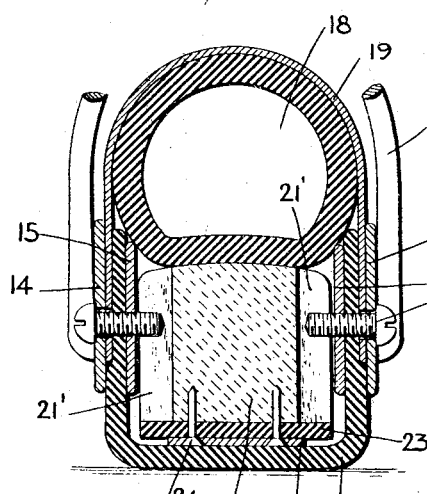
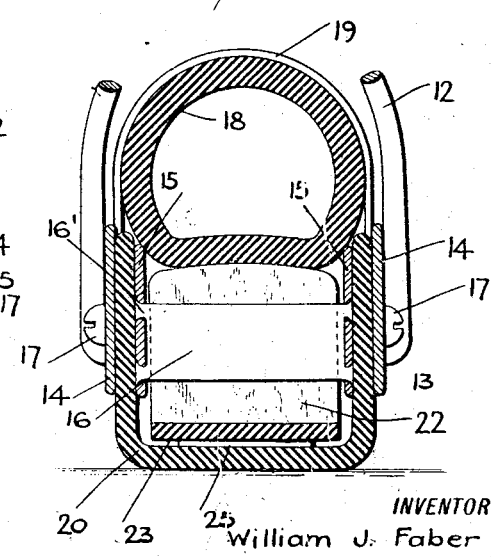
WITNESSES
H. J. Walker
Geo. L. Beele
INVENTOR
William J. Faber
BY Munn Co
ATTORNEYS

UNITED STATES PATENT OFFICE.

WILLIAM JOHN FABER, OF ONEIDA, NEW YORK, ASSIGNOR OF ONE-HALF TO CHRISTIAN C. FABER, OF BROOKLYN, NEW YORK.

RESILIENT WHEEL.

1,055,895.

Specification of Letters Patent.  Patented Mar. 11, 1913.

Application filed June 13, 1912. Serial No. 703,424.

*To all whom it may concern:*

Be it known that I, WILLIAM J. FABER, a citizen of the United States, and a resident of Oneida, in the county of Madison and State of New York, have invented a new and Improved Resilient Wheel, of which the following is a full, clear, and exact description.

This invention relates to wheels adapted for use on automobiles and other vehicles in which resiliency is required.

Among the objects of this invention is to construct a wheel having a pneumatic cushion spaced sufficiently far from the periphery or tread of the wheel to protect it from punctures or severe abrasion and yet provide the usual advantages of the pneumatic cushion now well known to pertain to pneumatic tires.

The foregoing and other objects of this invention will hereinafter be fully described and claimed and illustrated in the drawings accompanying this specification in which like characters of reference indicate corresponding parts in all the views, and in which—

Figure 1 is a side elevation of a wheel embodying a preferred form of the invention, said wheel being partly broken away and partly in section; and Figs. 2 and 3 are transverse sections on the lines 2—2 and 3—3, respectively, of Fig. 1, these views indicating the relative positions of the parts when under partial compression.

Referring particularly to the drawings, I show at 10 a wheel comprising a hub 11, a series of spokes 12 and a rim 13 to which the outer ends of the spokes are secured. The rim 13 comprises two pairs of annular plates, one plate 14 of each pair being connected rigidly to the adjacent plate 15 of the other pair. The plates 14 may be hereinafter referred to as the outer plates, and the plates 15 as the inner plates, for convenience of description. The inner plates are connected by a series of transverse plates or spacers 16 rigidly connected to the plates as by lugs 16' passed through said plates and upset therein. The plates 14 and 15 are connected in this instance by means of a series of removable fasteners such as screws 17 extending therethrough from the outside, said screws having threaded engagement with the inner plates and constituting a means for securing all of the plates substantially rigidly together as a unitary rim structure. The spokes 12 may be brazed or otherwise suitably rigidly and permanently connected to the outer annular plates.

The pneumatic cushion consists preferably of a tube 18 lying within said rim 13 and, in this instance, between the spokes 12. Said tube 18 is secured to the rim 13 in a substantial and permanent manner as by means of a series of U-shaped straps 19 which extend around the same and have their ends secured between the adjacent plates 14 and 15, the screws 17 passing through such ends.

The tread portion of the rim comprises a shoe 20 which is composed of some suitable tough and flexible material, such as raw hide, rubber or other material, and, as indicated in Figs. 2 and 3, consists substantially of an open sided tube, the edges of which extend between the inner and outer plates and there secured in place by the clamping effect of the screws 17. The outer or looped portion of the shoe extends beyond the periphery of the inner and outer plates and incloses a series of radially movable blocks 21 and 22 whose inner edges are in direct contact with the periphery of the tube 18. Each block is guided in its radial movements between a pair of the aforesaid spacers 16 and confined at its ends by the inner annular plates. The blocks 21 are provided with end grooves 21' also extending radially of the wheel, thereby providing free radial movement with respect to the inner ends of the screws. The blocks 21 and 22 are all preferably connected together each to each by means of a flexible strip or band 23 secured to the blocks by means of small nails or fasteners 24 as shown in Fig. 2. The ends of the fasteners may be prevented from passing through the strip 23 by means of small washers or plates 25.

From the foregoing description of the construction it will be observed that when the wheel is placed under strain or compression, the weight of the wheel and load will cause the lowermost blocks 21 and 22 to be moved radially with respect to the hub 11, such movement being resisted resiliently by the inflated tube 18. In other words, I provide a pneumatic wheel in which the pneumatic cushion is placed sufficiently far from the periphery of the wheel whereby I introduce between such periphery and the tube relatively movable elements of a nature to withstand the rough usage to which wheels of this nature are subjected, thereby relieving the comparatively thin pneumatic tube from such usage.

The several parts constituting this wheel may be made of any materials best suited for their several functions, and the relative sizes and proportions thereof may be varied to a considerable extent without departing from the spirit of the invention.

Having thus described my invention, what I claim as new and desire to secure by Letters Patent is:

1. In a wheel of the character set forth, the combination of a rim comprising a pair of outer plates, a pair of inner plates one adjacent each of the aforesaid plates, transverse means rigidly connecting the inner plates to each other, a series of radially movable blocks between the inner plates, a pneumatic tube lying in contact with the inner ends of said blocks, a tough flexible shoe embracing the outer ends of said blocks, portions of said shoe extending between the adjacent inner and outer plates, straps securing the tube in place, the ends of said straps likewise lying between the adjacent inner and outer plates, and removable fastening means passing through the inner and outer plates and securing said straps and shoe in place.

2. In a wheel of the character set forth, the combination of a pair of inner annular plates, a series of transverse spacers connecting said plates and rigidly secured thereto, a series of radially movable blocks confined between said plates and spacers, a flexible strip surrounding said blocks and securing them together, a tough flexible shoe surrounding said blocks and connecting strip, portions of said shoe lying against the outer faces of said plates, a pair of outer annular plates lying adjacent the inner plates and embracing said portions of the shoe, a pneumatic tube lying within the series of blocks and in contact with the inner ends thereof, a series of U-shaped straps securing the tube in place, said straps extending between adjacent inner and outer plates, and screws passing through said plates and straps and thereby securing the shoe in place.

In testimony whereof I have signed my name to this specification in the presence of two subscribing witnesses.

WILLIAM JOHN FABER.

Witnesses:
 IRENE F. CLARK,
 WHITESIDE HILL.

Copies of this patent may be obtained for five cents each, by addressing the "Commissioner of Patents, Washington, D. C."